United States Patent [19]

Iwai

[11] Patent Number: 4,568,590
[45] Date of Patent: Feb. 4, 1986

[54] FILM CONTAINER

[75] Inventor: Juro Iwai, Kanagawa, Japan

[73] Assignee: Fuji Photo Film Co., Ltd., Kanagawa, Japan

[21] Appl. No.: 566,449

[22] Filed: Dec. 28, 1983

[30] Foreign Application Priority Data

Dec. 28, 1982 [JP] Japan .......................... 57-197935[U]

[51] Int. Cl.$^4$ .............................................. B32B 3/02
[52] U.S. Cl. ...................................... 428/85; 206/316; 354/275; 354/277; 428/93; 428/95; 428/253
[58] Field of Search ...................... 428/85, 93, 94, 95, 428/253; 354/275, 277; 242/71.7; 206/316; 66/191, 194

[56] References Cited

U.S. PATENT DOCUMENTS 3,075,865 1/1963 Cochran ................................ 428/93
3,090,097 5/1963 Ruckstuhl ............................. 428/93
3,533,892 10/1970 Kantorowicz ....................... 428/93
3,623,602 11/1971 Valente ................................ 206/316
4,035,532 7/1977 Gregorian et al. ................. 428/253
4,172,165 10/1979 Kieckhefer et al. ................. 428/94
4,371,576 2/1983 Machell ................................ 428/93
4,400,418 8/1983 Takeda et al. ........................ 66/194

FOREIGN PATENT DOCUMENTS 661434 11/1951 United Kingdom ............... 206/316

Primary Examiner—James J. Bell
Attorney, Agent, or Firm—Sughrue, Mion, Zinn, Macpeak, and Seas

[57] ABSTRACT

A teremp cloth used to block light from entering an opening of a film container is made from a base cloth which is knitted, and pile yarns which are wound around the warps of the base cloth.

2 Claims, 6 Drawing Figures

FILM CONTAINER

BACKGROUND OF THE INVENTION

This invention relates to a film container having a teremp cloth bonded to the film withdrawing outlet.

Film containers, especially photographic film containers, are classified into two groups, i.e., cassettes for sheet films and cartridges for roll films. Each of the film containers has a light shielding member at its opening (outlet) through which the film is withdrawn in order to prevent the film from being prematurely exposed by light in the container. The light shielding member which is made of cloth is called a teremp cloth.

The teremp cloth is black so as to sufficiently protect the photographic film from unwanted exposure. In addition, the teremp cloth should be flexible so that the film will not be scratched or damaged when it is withdrawn or rewound.

Japanese Utility Patent Application Publication No. 20539/1971 has disclosed a film container having a teremp cloth bonded to the film withdrawing outlet. The teremp cloth is formed by weaving on a base cloth coreless pile yarns which are fabricated by coiling flexible yarns such as viscose or acetate yarns. Japanese Patent Application Laid-Open Nos. 36924/1979 and 36925/1979 have disclosed a film container with a teremp cloth having an electrostatically flocked structure.

In the case of a teremp cloth having a so-called "woven structure" such as a velvet-woven structure in which pile yarns or the like are woven on a base cloth, yarns are liable to come loose or to become frayed. Accordingly, the teremp cloth manufacturing procedure is intricate and the manufacturing cost is high. When the film is pulled out of the film container with the teremp cloth or when the film is rewound, yarns come loose or become frayed by friction which is caused by rubbing the teremp cloth with the film. The loosened yarns often stick to the photosensitive layer on the film, which may adversely affect the photographing operation.

The teremp cloth having the electrostatically flocked structure has a somewhat simplified manufacturing procedure as compared to the above-described woven cloth. However, since it is necessary to use adhesive the productivity is low. In addition, as the structure is simple, yarns are considerably more likely to come loose from the teremp cloth, so that the use of the teremp cloth having the electrostatically flocked structure is not practical.

SUMMARY OF THE INVENTION

An object of the present invention is to provide a film container having a teremp cloth in which the above-described difficulties accompanying conventional teremp cloths are overcome, namely a teremp cloth which is manufactured at low cost by a relatively simple method, and a teremp cloth which is free from the problems in which yarns come loose or become frayed.

The foregoing object of the present invention has been achieved by the provision of a film container which, according to the present invention, comprises a teremp cloth having a knitted structure, which is bonded to the film withdrawing outlet of the film container.

DETAILED DESCRIPTION OF THE INVENTION

Figure 1A:
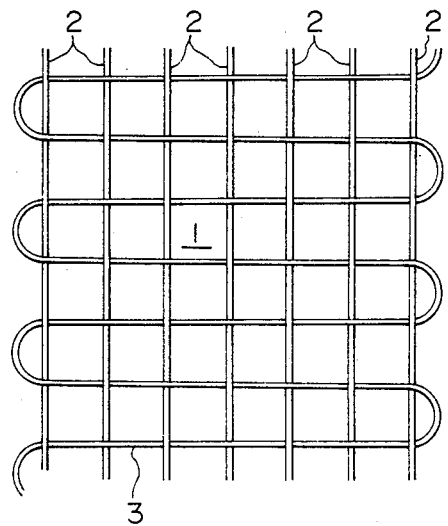
FIGS. 1a and 1b are enlarged plan views of a woven cloth structure and a knitted cloth structure.

The present invention will be described in detail with reference to the accompanying drawings. In the drawings, each figure has been enlarged in order to show the details of the cloth.

Figure 1B:
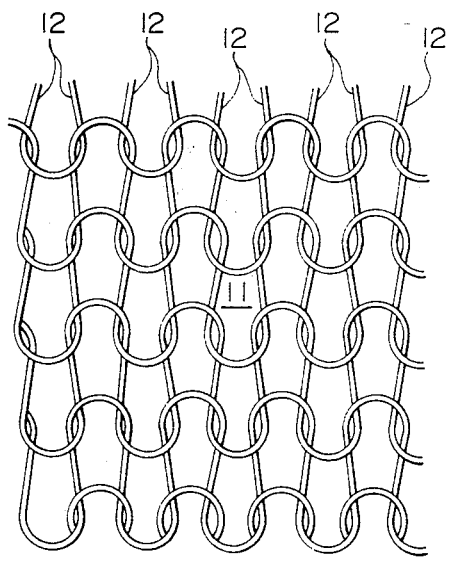

FIG. 1a is a plan view which illustrates the structure of a woven cloth, and FIG. 1b is a plan view which illustrates the structure of a knitted cloth.

Figure 2:
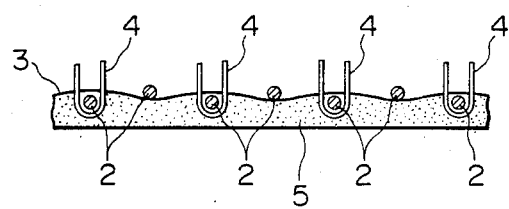
FIGS. 2 and 3 are sectional side views showing examples of a conventional teremp cloth.

FIG. 2 is a sectional side view showing the structure of a conventional teremp cloth. The teremp cloth is formed by interweaving pile yarns with a cloth which is formed by weaving warps 2 and wefts 3 as shown in FIG. 1a. A teremp cloth having this structure is formed as follows: as described in the specification of Japanese Utility Model Application Publication No. 20539/1971, warps 2 and wefts 3 are woven into a flat cloth, and then pile yarns 4 are engaged with the warps to form a double velvet cloth which is cut into several parts. The pile yarns 4 are fixed to the base cloth 1 with adhesive 5.

Figure 3:
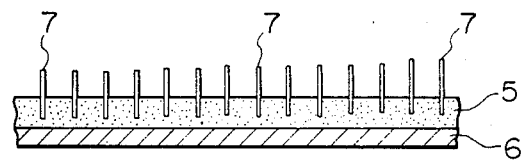

FIG. 3 is a sectional side view showing the structure of a conventional electrostatically flocked teremp cloth. The electrostatically flocked teremp cloth is manufactured as follows: a layer of adhesive 5 is formed on the bottom 6 of a container of metal, and short fibers 7 are electrostatically planted in the layer of adhesive 5.

Figure 4:
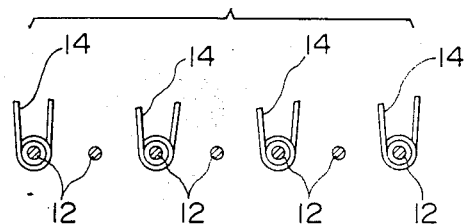
FIG. 4 is a sectional side view showing one example of a teremp cloth according to the present invention.

FIG. 4 is a sectional side view showing the structure of a teremp cloth which is formed by knitting according to the present invention. The teremp cloth is manufactured by interweaving pile yarns 14 with a cloth 11 which is formed by knitting warps 12 as shown in FIG. 1b. In other words, a knit work is formed by knitting pile yarns in advance, and then the pile yarns are pulled out by scratching the knit work with a brush or the like, to form loops. Thereafter, the loops of pile yarns thus formed are cut at the ends, to provide the teremp cloth.

Figure 5:
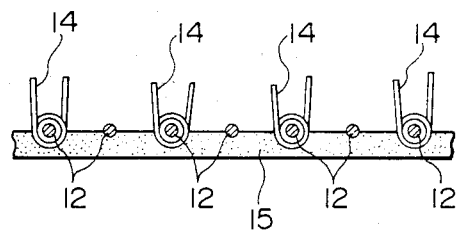
FIG. 5 is a sectional side view showing another example of the teremp cloth according to the present invention.

In FIG. 2, the pile yarns 4 are simply engaged with the warps 2. In FIG. 3, the short fibers 7 are merely planted. In both cases, it is necessary to use the fixing adhesive 5. On the other hand, in the present invention as shown in FIG. 4, the pile yarns 14 are wound around the warps 12, and accordingly the frequency of occurrence of the problem wherein the yarns come loose from the cloth and become frayed is greatly reduced, although no fixing adhesive is used. If the adhesive 15 is used as shown in FIG. 5, then the cloth is improved in quality. However, the object of the present invention can be sufficiently achieved by the cloth having the structure as shown in FIG. 4, because the cloth is bonded to the film pulling outlet of the film cartridge with adhesive.

Rayon, acetate, nylon and acrylic fibers can be selectively employed as the warps and pile yarns in the present invention. In the present invention, the knitted structure can be obtained by so-called "warp knitting" such as tricot knitting or raschel knitting, or by so-called "weft knitting" including various other knitting techniques.

In order to clarify the effects of the present invention, one example thereof will be described.

EXAMPLE

A teremp cloth having a double raschel knitting structure and having a section as shown in FIG. 4 was formed by using 50 denier nylon yarns as warps and 75 denier nylon yarns as pile yarns. The teremp cloth was bonded to a JIS 135 type photographic film cartridge.

The properties of the teremp cloth were as follows:
  Total thickness: 1.5 mm
  Pile density: 30000 pieces/cm$_2$ The light shielding characteristic was such that, when a photographic film of ASA 400 was exposed to an illuminance of 100,000 luxes, the film was sufficiently shielded from the light. No scratch was formed on the photographic film at room temperature. When the film cartridge was held at a temperature of 40° C. and a humidity of 80% RH for several hours, no yarns came loose from the cloth and no waste pile yarns stuck to the photosensitive layer of the photographic film.

COMPARISON EXAMPLE

The conventional teremp cloth having the structure as shown in FIG. 2 was manufactured by using 150 denier rayon cloth as a base cloth and 75 denier rayon yarns as pile yarns. The teremp cloth thus manufactured was bonded to a JIS 135 type photographic cartridge. The properties of this teremp cloth are substantially equal to those in the above-described example. No scratch was formed on the photographic film at room temperature. However, when the film cartridge was loaded in the camera after being held at a temperature of 40° C. and a humidity of 80% RH for several hours, it was found that loosened yarns and waste pile yarns stuck to the photosensitive layer of the photographic film.

In the present invention, the teremp cloth having a knitted structure is used. Accordingly, no waste pile yarns are created during the manufacture of the teremp cloth, and no yarns come loose from the teremp cloth when the latter is brought into contact with the film at the film withdrawing outlet of the film cartridge. The knitting speed is several times as fast as the weaving speed in the manufacture of a teremp cloth, and it is unnecessary to use the adhesive in the knitted teremp cloth. Thus, the film cartridge with a teremp cloth according to the present invention can be manufactured at considerably lower cost as compared to a film cartridge using a conventional teremp cloth.

I claim:

1. A teremp cloth used in combination with a film container comprising: a knitted cloth formed by knitting warps, and pile yarns extending out of said knitted cloth, each said pile yarn being wrapped more than 360° around one of said knitting warps.

2. A teremp cloth, as claimed in claim 1, said teremp cloth further comprising adhesive to secure said pile yarns to said knitted cloth.

* * * * *